US008838171B2

(12) United States Patent
Jang

(10) Patent No.: US 8,838,171 B2
(45) Date of Patent: Sep. 16, 2014

(54) MOBILE TERMINAL

(75) Inventor: Jun-Hyung Jang, Seoul (KR)

(73) Assignee: LG Electronics Inc., Seoul (KR)

(*) Notice: Subject to any disclaimer, the term of this patent is extended or adjusted under 35 U.S.C. 154(b) by 375 days.

(21) Appl. No.: 12/647,370

(22) Filed: Dec. 24, 2009

(65) Prior Publication Data

US 2010/0298029 A1  Nov. 25, 2010

(30) Foreign Application Priority Data

May 22, 2009 (KR) .......................... 10-2009-0045141

(51) Int. Cl.
*H04M 1/00* (2006.01)
*G06F 1/26* (2006.01)
*H04M 1/725* (2006.01)

(52) U.S. Cl.
CPC ........... *G06F 1/266* (2013.01); *H04M 1/72527* (2013.01)
USPC .............................................. 455/557; 710/8

(58) Field of Classification Search
CPC ............. H04M 1/72527; G06F 1/1632; G06F 3/0231; G06F 13/385; G06F 13/387
USPC .................................. 455/557, 572, 573; 710/8
See application file for complete search history.

(56) References Cited

U.S. PATENT DOCUMENTS

| | | | | |
|---|---|---|---|---|
| 6,130,518 A * | 10/2000 | Gabehart et al. | ............... | 320/103 |
| 7,635,280 B1 * | 12/2009 | Crumlin et al. | ............... | 439/489 |
| 2004/0075589 A1 * | 4/2004 | Wang et al. | ...................... | 341/22 |
| 2004/0103223 A1 * | 5/2004 | Gabehart et al. | ................... | 710/2 |
| 2004/0133716 A1 * | 7/2004 | Lee | ................................. | 710/72 |
| 2005/0148365 A1 * | 7/2005 | Lee | ............................... | 455/557 |
| 2005/0208963 A1 * | 9/2005 | Shinohara | .................. | 455/550.1 |
| 2006/0121948 A1 * | 6/2006 | Kwon | ........................... | 455/566 |
| 2006/0192689 A1 * | 8/2006 | Wang et al. | ...................... | 341/22 |
| 2007/0143120 A1 * | 6/2007 | Phadnis et al. | .................... | 705/1 |
| 2008/0022031 A1 * | 1/2008 | Lazzarotto et al. | ........... | 710/313 |
| 2008/0278002 A1 * | 11/2008 | Platania et al. | .................. | 307/49 |
| 2009/0011793 A1 * | 1/2009 | Pocrass | ...................... | 455/556.1 |
| 2009/0042608 A1 * | 2/2009 | Moon et al. | ................. | 455/556.1 |
| 2009/0042612 A1 * | 2/2009 | Moran et al. | ................... | 455/557 |
| 2009/0061841 A1 * | 3/2009 | Chaudhri et al. | .............. | 455/420 |
| 2009/0300239 A1 * | 12/2009 | Hubo et al. | ....................... | 710/63 |
| 2010/0031186 A1 * | 2/2010 | Tseng et al. | ................... | 715/786 |
| 2010/0052620 A1 * | 3/2010 | Wong | ............................ | 320/137 |
| 2010/0062806 A1 * | 3/2010 | Han | .............................. | 455/557 |
| 2010/0069117 A1 * | 3/2010 | Knighton | ....................... | 455/557 |

(Continued)

*Primary Examiner* — Nay A Maung
*Assistant Examiner* — Erica Fleming-Hall
(74) *Attorney, Agent, or Firm* — Birch, Stewart, Kolasch & Birch, LLP

(57) ABSTRACT

A mobile terminal including a wireless communication unit configured to at least perform wireless voice communication with at least one other terminal, a terminal body including a Universal Serial Bus (USB) port configured to be connected to an external device through the USB port, a detector configured to detect when the external device is connected to the USB port, a USB power identification unit configured to detect if the external device is providing USB power to the mobile terminal or if the mobile terminal is providing the USB power to the external device, and a controller configured to set the mobile terminal as a USB host device when the USB power identification unit determines the mobile terminal is providing the USB power to the external device, and to set the mobile terminal as a USB peripheral device when the USB power identification unit determines the external device is providing the USB power to the mobile terminal. Further, the set USB peripheral device is configured to send commands to the external device to perform operations on the external device.

14 Claims, 16 Drawing Sheets

(56) References Cited

U.S. PATENT DOCUMENTS

| | | |
|---|---|---|
| 2010/0070659 A1* | 3/2010 | Ma et al. .................... 710/14 |
| 2010/0201308 A1* | 8/2010 | Lindholm .................. 320/107 |
| 2010/0205472 A1* | 8/2010 | Tupman et al. ............. 713/340 |
| 2010/0234068 A1* | 9/2010 | Bolton et al. ............... 455/557 |
| 2011/0014947 A1* | 1/2011 | Liang ......................... 455/557 |
| 2011/0025262 A1* | 2/2011 | Fischer et al. .............. 320/107 |
| 2012/0331395 A2* | 12/2012 | Kummerfeld et al. ....... 715/750 |
| 2013/0007654 A1* | 1/2013 | Tseng et al. ................ 715/786 |

* cited by examiner

MOBILE TERMINAL

CROSS-REFERENCE TO A RELATED APPLICATION

Pursuant to 35 U.S.C. §119(a), this application claims the benefit of the earlier filing date and right of priority to Korean Application No. 10-2009-0045141 filed on May 22, 2009, the contents of which are incorporated by reference herein in its entirety.

BACKGROUND OF THE INVENTION

1. Field of the Invention

The present invention relates to a mobile terminal having a USB (Universal Serial Bus) port.

2. Description of the Related Art

Mobile terminals can be easily carried and have one or more functions such as supporting voice and video telephony calls, inputting and/or outputting information, storing data and the like. A mobile terminal can also capture still or moving images, play music or video files, play games, receive broadcasts and the like, so as to be implemented as an integrated multimedia player.

Some mobile terminals can also be connected to a USB host device such as a computer to charge the terminal, to download music onto the terminal, etc. However, a special cable is required to connect the mobile terminal, which does not have a USB port, to the USB port of the computer.

SUMMARY OF THE INVENTION

Accordingly, one object of the present invention is to address the above-noted and other problems.

Another object of the present invention is to allow a mobile terminal to function as a USB host or USB peripheral device.

Yet another object of the present invention to provide a mobile terminal that can be easily switched to a USB host or USB peripheral device.

To achieve these and other advantages and in accordance with the purpose of the present invention, as embodied and broadly described herein, the present invention provides in one aspect a mobile terminal including a wireless communication unit configured to at least perform wireless voice communication with at least one other terminal, a terminal body including a Universal Serial Bus (USB) port configured to be connected to an external device through the USB port, a detector configured to detect when the external device is connected to the USB port, a USB power identification unit configured to detect if the external device is providing USB power to the mobile terminal or if the mobile terminal is providing the USB power to the external device, and a controller configured to set the mobile terminal as a USB host device when the USB power identification unit determines the mobile terminal is providing the USB power to the external device, and to set the mobile terminal as a USB peripheral device when the USB power identification unit determines the external device is providing the USB power to the mobile terminal. Further, the set USB peripheral device sending commands to the external device to perform operations on the external device.

In another aspect, the present invention provides a method of controlling a mobile terminal, and which includes providing, via a wireless communication unit, at least wireless voice communication be performed on the mobile terminal with at least one other terminal, detecting, via a detector, when an external device is connected to a Universal Serial Bus (USB) port included in a terminal body of the mobile terminal, detecting, via a USB power identification unit, if the external device is providing USB power to the mobile terminal or if the mobile terminal is providing the USB power to the external device, and setting, via a controller, the mobile terminal as a USB host device when the USB power identification unit determines the mobile terminal is providing the USB power to the external device, and setting the mobile terminal as a USB peripheral device when the USB power identification unit determines the external device is providing the USB power to the mobile terminal. Further, the set USB peripheral device sending commands to the external device to perform operations on the external device.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Hereinafter, a mobile terminal having a USB port according to an embodiments of the present invention will be described in more detail with reference to the accompanying drawings.

Figure 1:
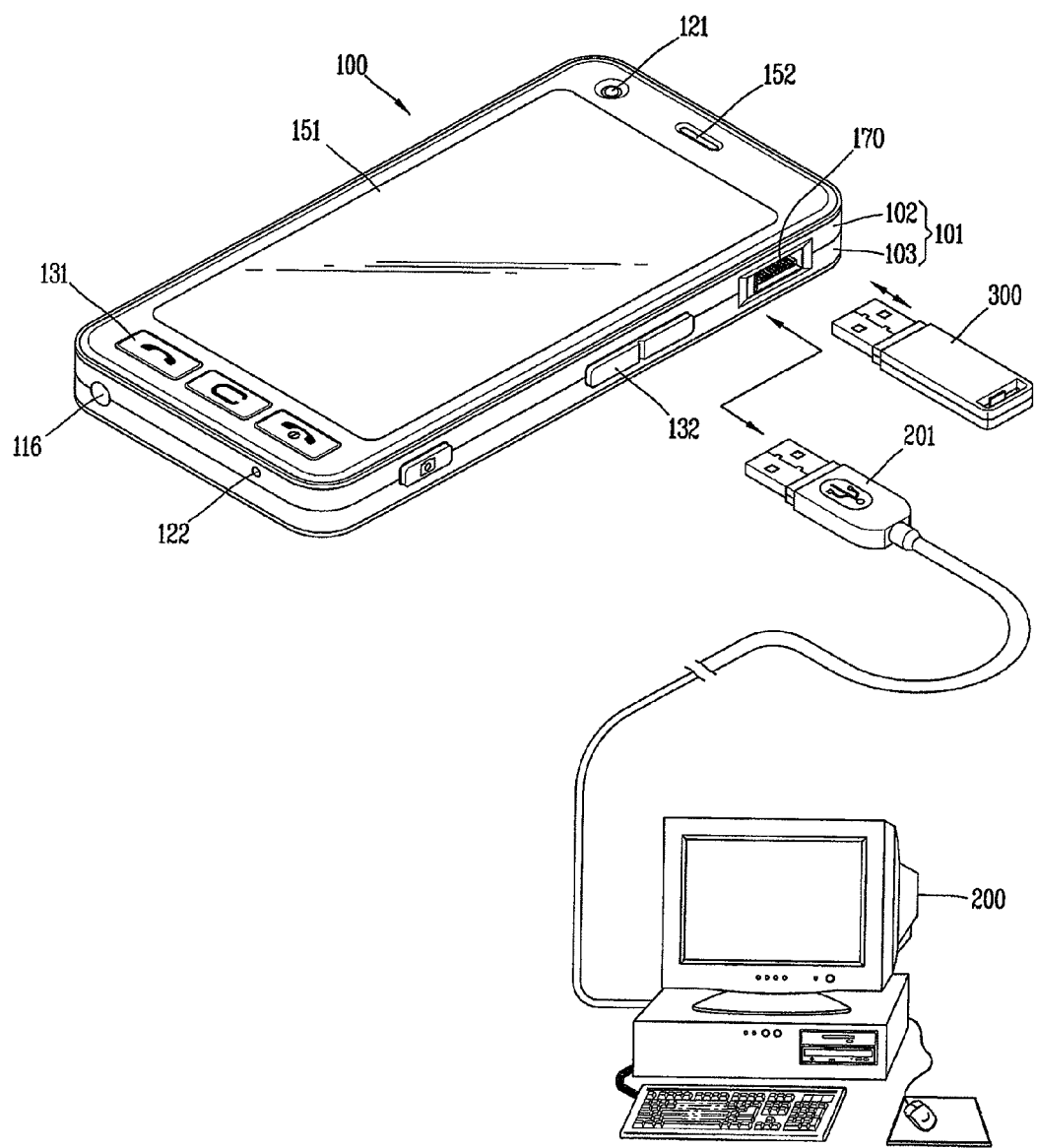
FIG. 1 is a front perspective view illustrating a mobile terminal according to an embodiment of the present invention.

FIG. 1 is a front perspective view illustrating a mobile terminal 100 according to an embodiment of the present invention. As shown, the mobile terminal 100 includes a terminal body 101 constituting an external appearance of the mobile terminal. However, the mobile terminal according to embodiments of the present invention is not limited to this type of terminal, and may be applicable to various types of terminals such as a slide type in which two or more bodies are combined with one another in a relatively movable manner, a folder type, a swing type, a swivel type, or the like. Moreover, the mobile terminal as described herein may be applicable to portable electronic devices such as a portable phone, a smart phone, a digital broadcasting terminal, a personal digital assistant (PDA), a portable multimedia player (PMP), and the like.

In addition, the terminal body 101 includes a case (a casing, a housing, a cover, or the like) that is divided into a front case 102 and a rear case 103. Various electronic components are also mounted in the space formed between the front case 102 and the rear case 103. Further, at least one intermediate case may be additionally disposed between the front case 102 and the rear case 103. The cases may also be formed by injection-molding synthetic resin, or be formed using metallic material, for example, stainless steel (STS), titanium (Ti), or the like.

Furthermore, a display unit 151, a first audio output unit 152, and a first video input unit 121 are disposed on a front surface of the terminal body 101. In more detail, the display unit 151 may include a Liquid Crystal Display (LCD) module, an Organic Light Emitting Diodes (OLED) module, e-paper, Transparent OLED (TOLED), etc. The display unit 151 may further include a touch detecting member through which a user can input information in a touch manner. Accordingly, when any one place is touched on the display unit 151, the content corresponding to the touched position is input. The content input by a touching method may be characters or numerals, menu items capable of instructing or indicating an operation in various modes, etc. Further, the touch detecting member is formed with a transparent material for a user to see the display unit, and may include a structure for enhancing the visibility of a touch screen in a bright place.

Also, in the embodiment shown in FIG. 1, the display unit 151 occupies most of the front surface of the front case 102. In addition, the first audio output unit 152 may be implemented in the form of a transmitter to transmit phone sounds, or a speaker to output various alarm sounds or to output multimedia sounds (e.g., music). Furthermore, a side key 132, a USB port 170, and an audio input unit 122 are also disposed on a lateral surface of the terminal body 101.

The side key 132 may be designated as a manipulating unit, and thus can receive a command from the user for controlling an operation of the mobile terminal 100. In addition, any method may be employed to operate the side key 132 including providing tactile feedback to the user while he or she is manipulating the side key 132. Further, the content input using the side key 132 may be set in various ways. For example, the user can use the side key 132 to control a second video input unit 121', adjust a volume of audio output from audio output units 152, 152', switch the display unit 151 into a touch recognition mode, etc.

In addition, the audio input unit 122 may be implemented, for example, in the form of a microphone to receive the user's voice, other sounds, and the like. Also, the universal serial port (USB) 170 provides a path through which the mobile terminal 100 can exchange data with an external device. In particular, the mobile terminal 100 according to embodiments of the present invention can be used as a USB host or USB peripheral device. Further, the mobile terminal 100 operates as a USB peripheral device when the mobile terminal 100 is connected to a USB host such as a computer, and operates as a USB host when the mobile terminal 100 is connected to a device such as a USB memory stick.

In addition, FIG. 1 illustrates examples of external devices that can be connected to the mobile terminal 100 such as a computer 200 and a USB memory stick 300. Thus, if the terminal 100 is connected the USB memory stick 300, the mobile terminal 100 can receive data stored in the USB memory stick 300, or store data in the USB memory stick 300. If the mobile terminal 100 is connected to the computer 200 through the USB port 170, the mobile terminal 100 can be used as a sort of USB memory with respect to the computer 200. Further, the USB port 170 can be covered by a cover when it is not used. For example, the cover can be a plug-type or slide-type cover made of a rubber material.

FIG. 1 also illustrates an inlet of the USB port 170 exposed on an upper lateral surface of the terminal. However, the USB port 170 can be disposed so as to be exposed to a lateral surface of the upper or lower end of the terminal body 101, and be configured to be rotated or protruded (or popped up) around or from the terminal body 101. A metal portion constituting the USB port 170 can also be concurrently used as an antenna for wireless mobile communication, broadcast reception, or GPS. Moreover, the metal portion constituting the USB port 170 is preferably connected to the ground of a circuit board within the terminal body 101, thereby dissipating heat generated in the circuit board.

Figure 2:
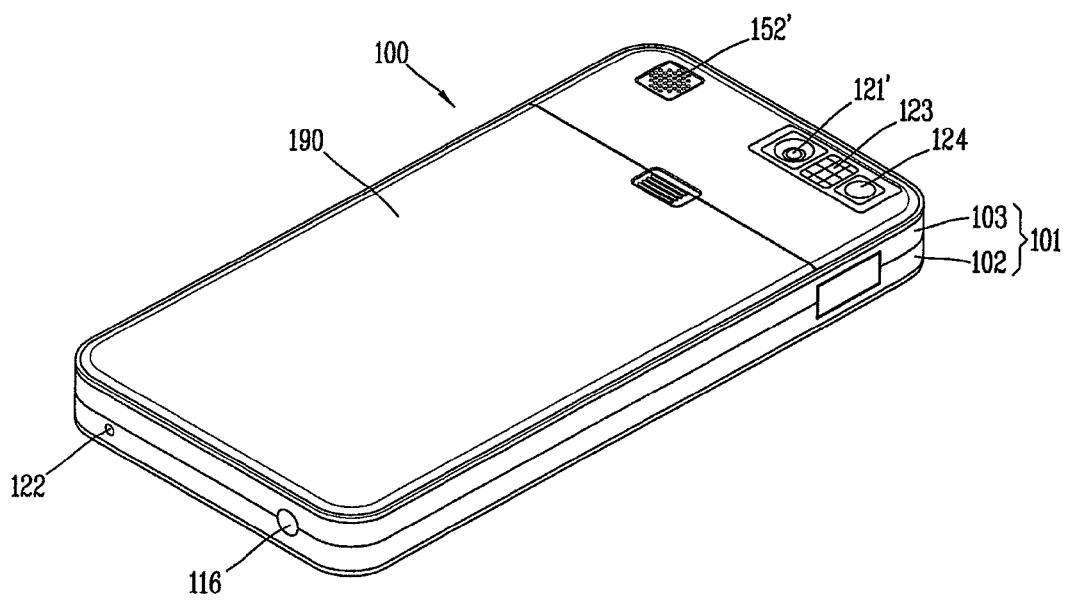
FIG. 2 is a rear perspective view illustrating the mobile terminal of FIG. 1.

Next, FIG. 2 is a rear perspective view illustrating the mobile terminal of FIG. 1. As shown, a second video input unit 121' is mounted on a rear surface of the terminal body 101. The second video input unit 121' has an image capturing direction, which is substantially opposite to the direction of the first video input unit 121 disposed on the front surface thereof, and may have different pixels from those of the first video input unit 121. For example, it is preferable that the first video input unit 121 has a relatively small number of pixels enough for the user's face to be captured and transmitted to another party during a video call or the like, and the second video input unit 121' has a relatively large number of pixels for allowing the user to capture a general object that is not immediately transmitted. The second video input unit 121' may also be provided in the terminal body 101 in a rotatable and popupable manner.

Furthermore, a flash 123 and a mirror 124 are disposed adjacent to the second video input unit 121'. In more detail, the flash 123 illuminates light toward an object when capturing the object with the camera 121'. The mirror 124 allows the user to look at his or her own face, etc. when capturing himself or herself (e.g., in a self-portrait mode by using the second video input unit 121').

Also, a second audio output unit 152' is disposed on a rear surface of the terminal body 101. Thus, the second audio output unit 152' together with the first audio output unit 152 can implement a stereo function. Either audio output unit can also be used to implement a speaker phone mode during a phone call. Furthermore, a power supply unit 190 is mounted on a rear surface of the terminal body 101 for supplying power to the mobile terminal 100. The power supply unit 190 may be incorporated in the terminal body, or configured to be detachable from the terminal body.

Figure 3:
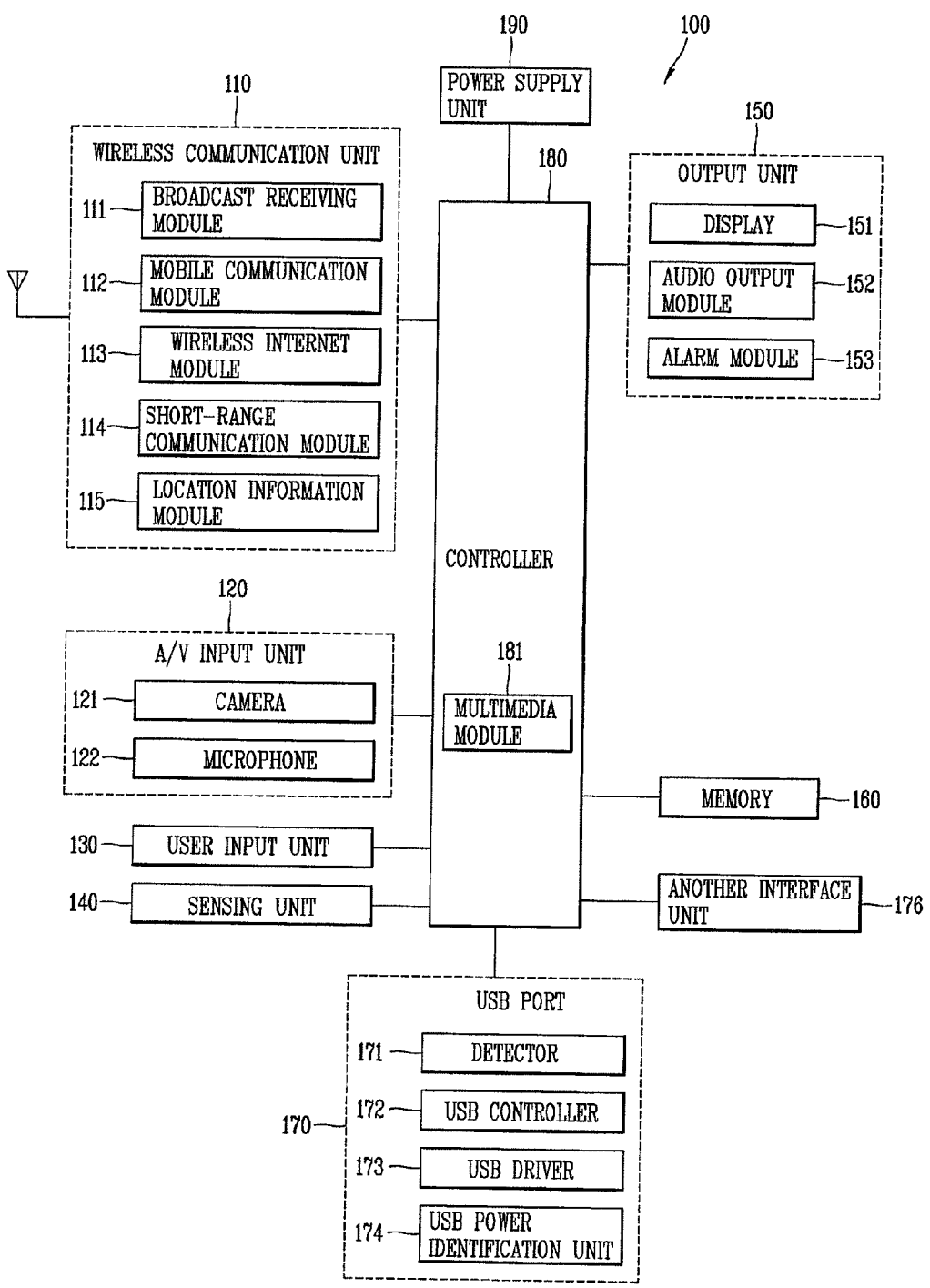
FIG. 3 is a block diagram illustrating a mobile terminal according to an embodiment of the present invention.

Next, FIG. 3 is a block diagram illustrating the mobile terminal 100 according to an embodiment of the present invention. Some of the elements shown in FIGS. 1 and 2 are also shown in FIG. 3. As shown, the mobile terminal 100 includes a wireless communication unit 110, an Audio/Video (NV) input unit 120, a user input unit 130, a sensing unit 140, an output unit 150, a memory 160, a USB port 170, a controller 180, the power supply unit 190 and the like. FIG. 3 also illustrates the mobile terminal 100 having various elements in addition to the USB port 170. However, all the illustrated elements are not necessarily required, and the terminal may be implemented with greater or less number of elements than those illustrated elements.

Further, the wireless communication unit 110 includes one or more elements allowing radio communication between the mobile terminal 100 and a wireless communication system, or allowing radio communication between the mobile terminal 100 and a network in which the mobile terminal 100 is located. For example, in FIG. 3, the wireless communication unit 110 includes a broadcast receiving module 111, a mobile communication module 112, a wireless Internet module 113, a short-range communication module 114, and a location information module 115.

The broadcast receiving module 111 receives broadcast signals and/or broadcast associated information from an external broadcast management server through a broadcast channel. The broadcast channel may include a satellite channel and/or a terrestrial channel. Further, the broadcast management server corresponds to a server that generates and transmits a broadcast signal and/or broadcast associated information, or a server that receives a previously generated broadcast signal and/or broadcast associated information and transmits to the mobile terminal 100. The broadcast associated information corresponds to information regarding a broadcast channel, a broadcast program, a broadcast service provider, and the like. In addition, the broadcast signal may include a TV broadcast signal, a radio broadcast signal and a data broadcast signal as well as a broadcast signal in a form that a data broadcast signal is combined with the TV or radio broadcast signal.

Further, the broadcast associated information may also be provided through a mobile communication network, and in this instance, the broadcast associated information may be received by the mobile communication module 112. Also, the broadcast signal may exist in various forms such as an electronic program guide (EPG) of the digital multimedia broadcasting (DMB) system, an electronic service guide (ESG) of the digital video broadcast-handheld (DVB-H) system, and the like.

In addition, the broadcast receiving module 111 can receive a broadcast signal using various types of broadcast systems. In particular, the broadcast receiving module 111 can receive a digital broadcast signal using a digital broadcast system such as the digital multimedia broadcasting-terrestrial (DMB-T) system, the digital multimedia broadcasting-satellite (DMB-S) system, the media forward link only (MediaFLO) system, the digital video broadcast-handheld (DVB-H) system, the integrated services digital broadcast-terrestrial (ISDB-T) system, etc. The broadcast receiving module 111 can also be configured to be suitable for all broadcast systems that provide a broadcast signal as well as the above-mentioned digital broadcast systems.

Further, the broadcast signal and/or broadcast-associated information received through the broadcast receiving module 111 may be stored in the memory 160. Also, the mobile communication module 112 transmits and/or receives a radio signal to and/or from at least one of a base station, an external terminal and a server over a mobile communication network. In addition, the radio signal may include a voice call signal, a video call signal and/or various types of data according to text and/or multimedia message transmission and/or reception. In addition, the wireless Internet module 113 corresponds to a module for supporting wireless Internet access and may be built-in or externally installed to the mobile terminal 100. In addition, the module 113 may use a wireless Internet access technique including a WLAN (Wireless LAN), Wi-Fi, Wibro (Wireless Broadband), Wimax (World Interoperability for Microwave Access), HSDPA (High Speed Downlink Packet Access), and the like.

Further, the short-range communication module 114 is a module for supporting a short-range communication and may use a short-range communication technology including Bluetooth, Radio Frequency IDentification (RFID), Infrared Data Association (IrDA), Ultra WideBand (UWB), ZigBee, etc. Also, the location information module 115 is a module for checking or acquiring a location of the mobile terminal and as an example includes a GPS module. In this example, the GPS module receives location information from a plurality of satellites and which includes coordinate information represented by latitude and longitude values. Thus, the GPS module can measure an accurate time and distance from three or more satellites, and accurately calculate a current location according to trigonometry based upon three different distances. That is, the GPS module can calculate distance and time information using three satellites and perform error correction using an additional satellite. Moreover, the GPS module 115 can continuously calculate its current location in real time, thereby calculating speed information.

Further, the NV (audio/video) input unit 120 receives an audio or video signal, and in FIG. 3, includes the camera 121 (first video input unit 121 in FIG. 1) and the microphone 122 (audio input unit 122 in FIG. 1). The camera 121 processes image frames such as still pictures or video frames obtained by an image sensor in a video phone call or image capturing mode. The processed image frame or frames can then be displayed on the display unit 151. Also, the image frames processed by the camera 121 may be stored in the memory 160 or other storage medium, or be transmitted through the wireless communication unit 110. Two or more cameras 121 may also be provided according to the configuration type and/or use environment of the mobile terminal such as described above with respect to FIG. 2.

In addition, the microphone 122 receives an external audio signal through a microphone in a phone call mode, a recording mode, a voice recognition mode, etc. and processes the audio signal into electrical voice data. The processed voice data is then converted and output into a format that is transmittable to a mobile communication base station through the mobile communication module 112 in the phone call mode. The microphone 122 can also include various types of noise canceling algorithms to cancel noise generated in a procedure of receiving the external audio signal.

Further, the user input unit 130 can generate input data to control an operation of the terminal. The user input unit 130 may be configured by including a keypad, a dome switch, a touch pad (pressure/capacitance), a jog wheel, a jog switch, and the like. In addition, the sensing unit 140 detects a current status of the mobile terminal 100 such as an opened or closed state of the mobile terminal 100, a location of the mobile terminal 100, an orientation of the mobile terminal 100, etc., and generates a sensing signal for controlling the operation of the mobile terminal 100. For example, when the mobile terminal 100 is a slide phone type, the sensing unit 140 can sense an opened or closed state of the slide phone. Furthermore, the sensing unit 140 takes charge of a sensing function associated with whether or not power is supplied from the power supply unit 190.

In addition, the output unit 150 is configured to provide an output for audio signal, video signal, or alarm signal, and in FIG. 3 includes the display unit 151, the audio output module 152 (first audio output unit 152 in FIG. 1), and an alarm unit 153. The display unit 151 displays information processed in the mobile terminal 100. For example, when the mobile terminal 100 is in a phone call mode, the display unit 151 can display a User Interface (UI) or a Graphic User Interface (GUI) associated with a call. When the mobile terminal 100 is in a video call mode or image capturing mode, the display unit 151 can display a captured image and/or received image, a UI or GUI.

Also, as described above, when the display unit 151 and a touch sensor constitutes a layer structure with each other to form a touch screen, the display unit 151 can be used as an input device as well as an output device. The display unit 151 can also include at least one of a Liquid Crystal Display (LCD), a Thin Film Transistor-LCD (TFT-LCD), an Organic Light Emitting Diode (OLED) display, a flexible display, a three-dimensional (3D) display, etc. Some of those displays may be configured with a transparent or optical transparent type to allow viewing of the exterior through the display unit, which may be called transparent displays. An example of a transparent display is a transparent LCD. Furthermore, two or more display units 151 may be included in the terminal. The touch screen may be configured to detect a touch input pressure as well as a touch input position and a touch input area.

In addition, a proximity sensor may be arranged on an inner side of or adjacent to the touch screen. In more detail, the proximity sensor is a sensor for detecting the presence or absence of an object approaching a certain detection surface or an object that exists nearby by using the force of electromagnetism or infrared rays without a mechanical contact. Thus, the proximity sensor has a considerably longer life span compared with a contact type sensor, and it can be utilized for various purposes. Examples of the proximity sensor include a transmission type photo sensor, a direct reflection type photo sensor, a mirror-reflection type photo sensor, an RF oscillation type proximity sensor, a capacitance type proximity sensor, a magnetic proximity sensor, an infrared proximity sensor, and the like.

For the RF oscillation type proximity sensor, when an object approaches the sensor detection surface in a state that an RF (Radio Frequency) of a static wave is oscillated by an oscillation circuit, the oscillation amplitude of the oscillation circuit is attenuated or stopped, and such a change is converted into an electrical signal to detect the presence or absence of an object. Thus, if a material is positioned between the RF oscillation proximity sensor and the object, a proximity switch can detect the object.

Further, if the touch screen is an electrostatic type, the touch screen can be configured such that the approach of a pointer can be detected based on a change in a field according to the approach of the pointer. Thus, although the pointer is not actually brought into contact with the touch screen but is merely positioned close to the touch screen, the position of the pointer and the distance between the pointer and the touch screen can be detected. In the following description, the recognition of the pointer positioned to be close to the touch screen, although the pointer is not actually brought into contact with the touch screen, will be called a "proximity touch", while recognition of actual contacting of the pointer on the touch screen will be called a "contact touch". The position where the pointer is proximately touched on the touch screen also corresponds to a position where the pointer is positioned to correspond vertically to the touch screen when the pointer is proximately touched.

Furthermore, by using the proximity sensor, a proximity touch, and a proximity touch pattern (for example, a proximity touch distance, a proximity touch direction, a proximity touch speed, a proximity touch time, a proximity touch position, a proximity touch movement state, or the like) can be detected. Information corresponding to the detected proximity touch operation and the proximity touch pattern can also be output to the touch screen.

In addition, the audio output module 152 can output audio data received from the wireless communication unit 110 or stored in the memory 160 in a call signal reception mode, a call mode, a record mode, a voice recognition mode, a broadcast reception mode, etc. Also, the audio output module 152 can output an audio signal associated with the function performed by the mobile terminal 100 (for example, a call signal reception sound, a message reception sound, etc.). The audio output module 152 may also include a speaker, a buzzer, and the like.

Further, the alarm unit 153 can output a signal to notify the occurrence of an event of the mobile terminal 100. Examples of the event occurring in the mobile terminal 100 include a call signal reception, a message reception, a key signal input, a touch input, and the like. In addition to an audio or video output, the alarm unit 153 can output a signal in a different manner to notify the occurrence of an event. For example, the alarm unit 153 can output in a form of vibration. Thus, when a call signal or message is received, the alarm unit 153 can vibrate the mobile terminal. When a key signal is input, the alarm unit 153 can vibrate the mobile terminal through vibration using a feedback to the key signal input. The user can then recognize an occurrence of the vibration as described above. The signal for notifying an occurrence of the event may also be output through the display unit 151 or the audio output module 152.

Further, the memory 160 can store software programs for processing and operation with the controller 180, or temporarily store data (for example, a phonebook, message, still image, video, and the like) that are input and/or output. The memory 160 can also store data regarding various patterns of the vibration and audio signal to be output at a time of touch input to the touch screen. In addition, the memory 160 may include at least one type of storage medium including a Flash memory type, a hard disk type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only Memory (PROM) magnetic memory, a magnetic disk, an optical disk, and the like. Also, the mobile terminal 100 may run a web storage that performs the storage function of the memory 160 over the Internet.

Further, when the memory 160 is connected to a USB host device through the USB port 170, the memory 160 can function as an external storage device of the USB host. In other words, when the mobile terminal 100 is connected to a USB host device through the USB port 170, the USB host device supplies power through the USB port 170, and reads or writes data from or to the memory 160. In this manner, the USB port 170 serves as an interface to the external device connected with the mobile terminal 100.

In addition, the mobile terminal 100 can also be connected to a USB peripheral device in addition to being connected to the USB host device, and in this instance, the mobile terminal 100 operates as a USB host device. For this purpose, the mobile terminal 100 includes a USB host controller 172. Also, examples of the USB peripheral device include at least one of a keyboard, a mouse, a game pad, a joystick, a scanner, a digital camera, a printer, a PDA, a storage device, etc.

Further, the mobile terminal 100 may include USB drivers 173 for recognizing each USB peripheral devices, respectively.

In addition, the USB port 170 can access a charger in an external USB method, and in this instance, when the mobile terminal 100 is connected to the external charger, the USB port 170 functions as a path to supply power from the charger to the mobile terminal 100, or a path for transmitting various command signals input from a cradle by the user to the mobile terminal. Various command signals or power received from the charger may also operate as a signal for recognizing that the mobile terminal 100 is correctly mounted on the charger.

Figure 4:
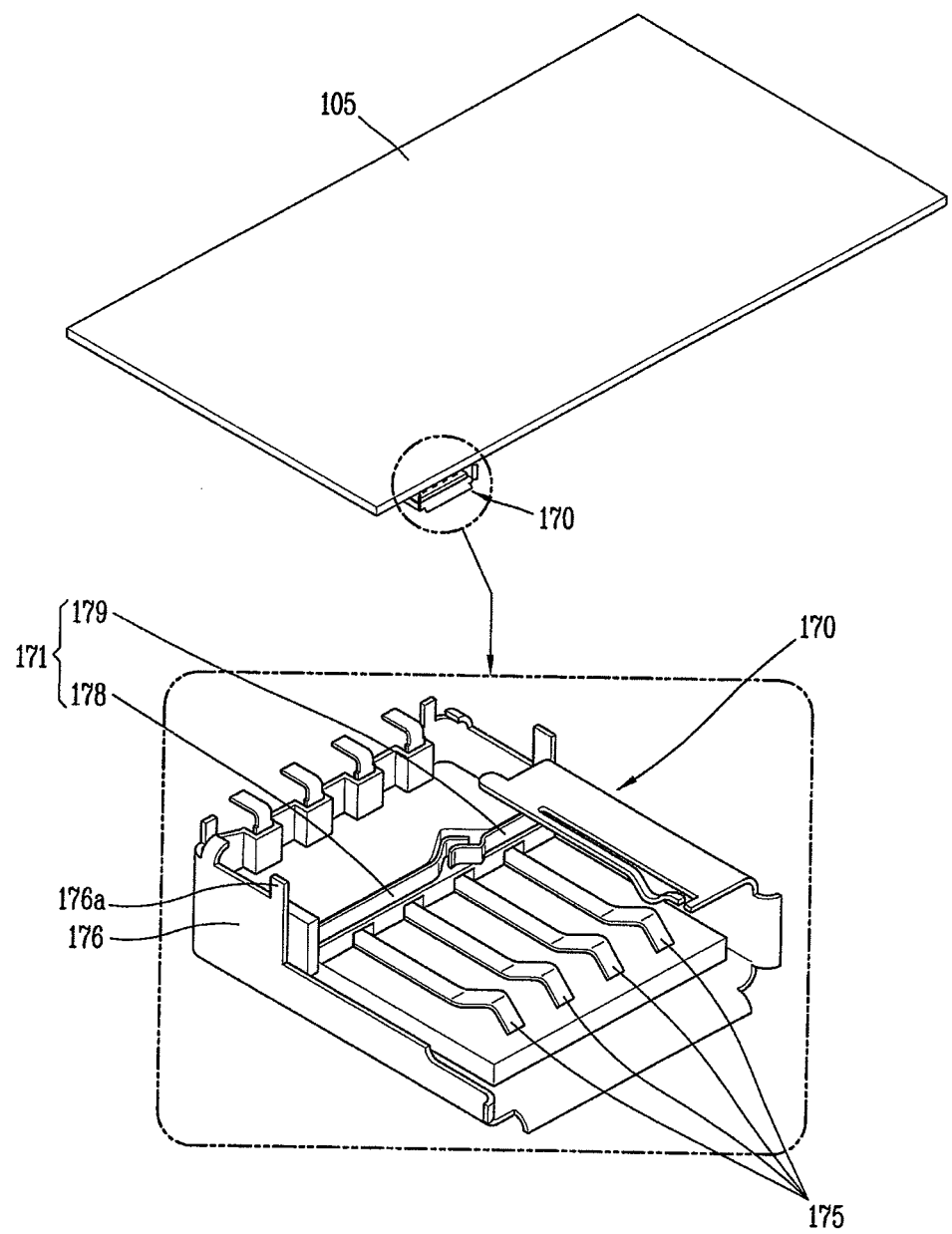
FIG. 4 is an enlarged perspective view illustrating a USB port as an example according to an embodiment of the present invention.

Further, as shown in FIG. 3, the USB port 170 includes a detector 171 that detects the insertion of a USB connector. The detector 171 may be implemented in a mechanical form as illustrated in FIG. 4, or may be implemented in a form of software. When the insertion of a USB connector is detected by the detector 171, the controller 180 determines whether or not the USB connector is connected to a USB host device or USB peripheral device.

In more detail, the USB port 170 includes a USB power identification unit 174 for detecting whether or not power is supplied from the USB connector. When the power supplied from the USB connector is detected by the USB power identification unit 174 in a state that the insertion of the USB connector is detected by the detector 171, the controller 180 determines that the USB connector is connected to the USB host device, and sets the mobile terminal 100 as a USB peripheral device. On the contrary, when the power supplied from the USB connector is not detected by the USB power identification unit 174 within a predetermined period of time in a state that the insertion of the USB connector is detected by the detector 171, the controller 180 sets the mobile terminal 100 as a USB host device, and supplies power to the USB peripheral device connected to the USB connector.

In addition to the USB port 170, the mobile terminal 100 also includes another form of interface 176. Examples of the interface 176 include a wired or wireless headset port, an external battery charger port, a wired or wireless data port, a memory card port, a port for connecting a device having an identification module, an audio input/output (I/O) port, a video input/output (I/O) port, an earphone port, and the like. Further, the identification module, as a chip storing various information for authenticating the authority to use the mobile terminal 100, may include a user identity module (UIM), a subscriber identity module (SIM), a universal subscriber identity module (USIM), etc.

In addition, the device having the identification module (hereinafter, 'identification device') may be made in a form of smart card. Accordingly, the identification device may be connected with the mobile terminal 100 through a port. Further, the USB port 170 is provided to receive data or power from an external device and transfer the received data or power to elements within the mobile terminal 100 or may be used to transfer data within the mobile terminal 100 to an external device.

In addition, the controller 180 controls an overall operation of the mobile terminal 100. For example, the controller 180 performs control and processing operations associated with a voice call, data communication, a video phone call, and the like. In addition, the controller 180 includes a multimedia module 181 for reproducing multimedia contents. The multimedia module 181 may be provided within the controller 180 or may be separately provided from the controller 180. The controller 180 can also perform a pattern recognition processing to recognize a handwriting or picture-drawing input performed on the touch screen as a character or image, respectively.

Moreover, the controller 180 operating with the elements of the USB port 170 sets the mobile terminal 100 as a USB peripheral device if power is supplied from the USB connector inserted into the USB port 170, and sets the mobile terminal 100 as a USB host device if power is not supplied from the USB connector within a predetermined period of time. As another example, the controller 180 can provide a user interface capable of selecting either one of the USB host and USB peripheral device to be recognized when a connection of the USB connector is detected.

In addition, the power supply unit 190 receives external or internal power to supply the power used for an operation of each element under a control of the controller 180. Further, the function of an element applied to the mobile terminal 100 may be implemented in a computer-readable medium using software, hardware, or any combination thereof. For a hardware implementation, it may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some instances, such embodiments may be implemented in the controller 180.

For a software implementation, the embodiments such as procedures or functions may be implemented together with separate software modules that allow performing of at least one function or operation. Software codes can be implemented by a software application written in any suitable programming language. The software codes may be stored in the memory 160 and executed by the controller 180.

Next, FIG. 4 is an enlarged perspective view illustrating the USB port 170 according to an embodiment of the present invention. Further, the physical USB port 170 is built in the terminal body 101 (see FIG. 1), and includes an anchoring protrusion 176a for firmly maintaining a fixed state to a circuit board 105 during repetitive in-and-out movements of a USB connector. In this embodiment, the USB port 170 is a 4-pin USB Type A having four pins 175. In other words, for a USB peripheral device, a Micro-USB Type A is more commonly used than a Micro-USB Type B, which has five pins (i.e., a fifth D pin).

Thus, the Micro-USB Type A connector is preferably used as the USB port 170. Also, the four pins 175 includes a VBUS pin for supplying power, D+ and D-pins for transmitting and/or receiving data, and a GND pin for the ground. Furthermore, the USB port 170 includes the detector 171 for detecting the insertion of a USB connector connected to an external device. As shown, the detector 171 floats from the ground of the terminal body when a USB connector is not inserted, and connected to the ground when the USB connector is inserted.

In more detail, and as shown in FIG. 4, the detector 171 includes a fixed pin 178 that is fixed to a body unit 176 constituting the USB port 170, and a movable pin 179 that is disposed to be separated from the fixed pin 178 by a predetermined gap. Thus, when the USB connector is not inserted, the fixed pin 178 is connected to the ground, and the movable pin 179 floats away from the ground because it is separated from the fixed pin 178. In addition, the movable pin 179 can be pressed and deformed by a USB connector. Accordingly, the movable pin 179 is pressed by the USB connector when the USB connector is inserted and is in contact with the fixed pin 178, and then restored to an original state when the USB connector is removed from the USB port 170.

Figure 5A:
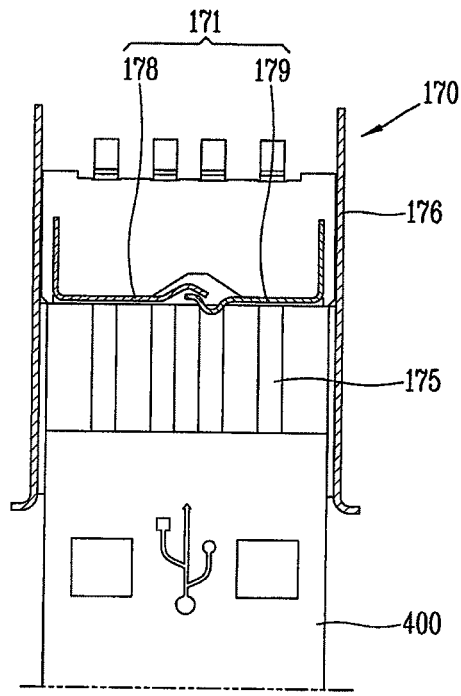
FIGS. 5A and 5B are operational state diagrams illustrating an operation state of a detector by the insertion of a USB connector according to an embodiment of the present invention.
Figure 5B:
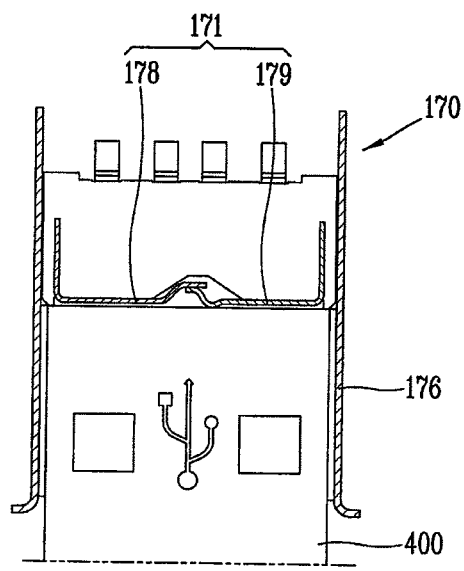

Next, an operation of the detector 171 will be described with respect to FIGS. 5A and 5B. In particular, FIG. 5A is an overview illustrating a state prior to a USB connector 400 being inserted into the USB port 170, and FIG. 5B is an overview illustrating a state when the USB connector 400 has been completely inserted into the USB port 170. As shown in FIG. 5A, the pins 178 and 179 do not contact each other (i.e., the moveable pin 179 floats away from the fixed pint 178). As shown in FIG. 5B, as the USB connector 400 is fully inserted into the USB port 170, the moveable pin 179 moves via the USB connector 400 and makes contact with the fixed pin 178.

Thus, the detector 171 plays an actual role when the USB connector 400 is connected to the USB peripheral device. In other words, when the USB connector 400 is provided by a USB host device, power is supplied from the USB host device, and therefore it can be recognized as a USB host device by the supplied power. However, when the USB connector 400 is provided by a USB peripheral device, power is not recognized prior or subsequent to the insertion. Accordingly, the timing of inserting the USB connector 400 will be a reference point, which is used for determining that power has not been supplied.

In addition to the above configuration provided by the fixed pin 178 and movable pin 179 as illustrated in FIGS. 4 and 5, a similar detecting result can be obtained by using a sensor member (for example, an optical sensor, magnetic sensor, or the like). The shape of the USB port 170 may also have various shapes to accommodate the fixed pin 178 and movable pin 179.

Figure 6A:
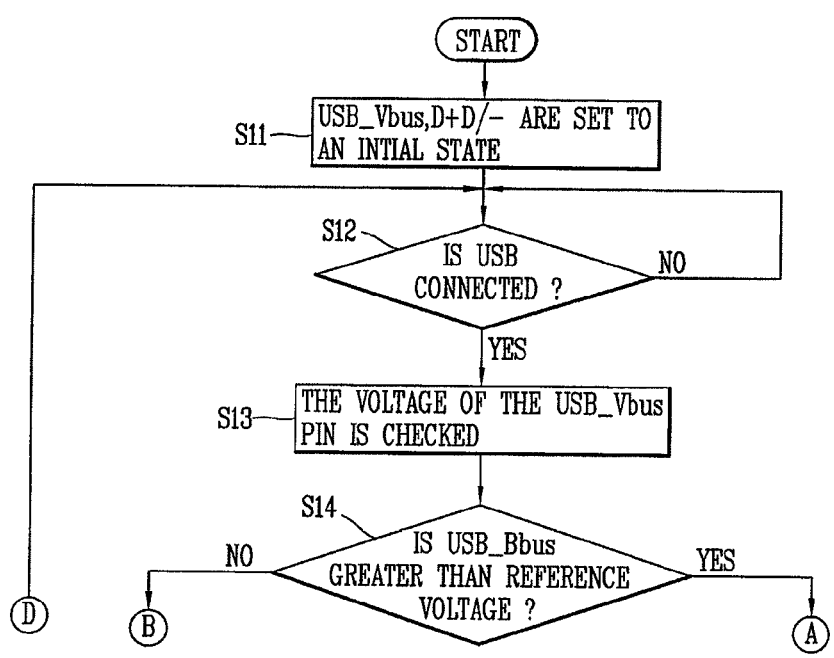
FIGS. 6A to 6C are flow charts illustrating a USB connection method according to an embodiment of the present invention.
Figure 6B:
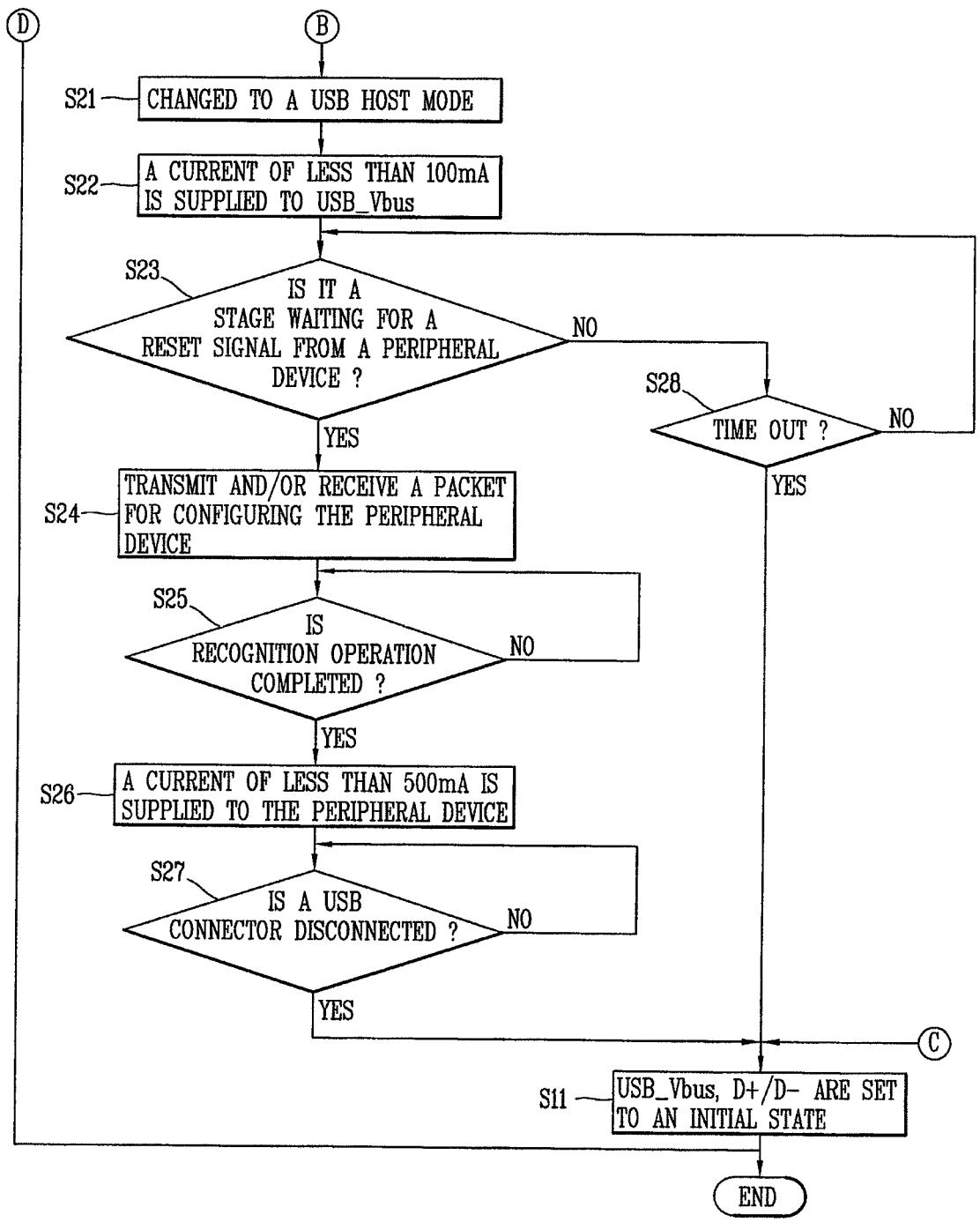
Figure 6C:
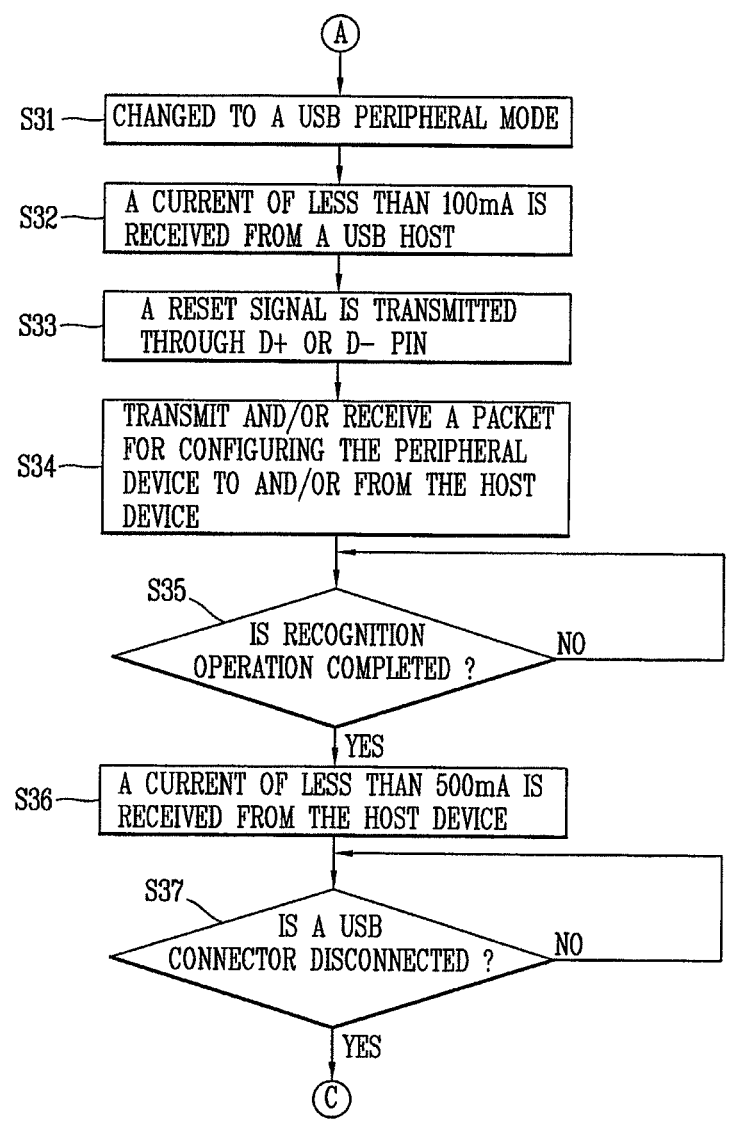

Next, FIGS. 6A to 6C are flow charts illustrating a USB connection method according to an embodiment of the present invention. As shown in FIG. 6A, the USB_Vbus pin associated with the power supply, and the D+/D− pins associated with data transmission and/or reception are all set to an initial state (S11). Then, the detector 171 determines whether or not the USB connector 400 is inserted (S12). When the USB connector 400 is inserted (Yes in S12), the controller 180 checks the power or voltage of the USB connector 400 (S13). The controller 180 then compares the detected power or voltage with a reference value (S14).

If the voltage detected through the USB connector 400 is greater than a predetermined value (Yes in S14), then controller 180 determines the external device connected to the USB connector 400 is a USB host device. If the controller 180 determines the voltage is less than the predetermined value (No in S14), the controller 180 determines the external device connected to the USB connector 400 is a USB peripheral device.

Thus, as shown in FIG. 6B, the controller 180 changes the mode of the mobile terminal 100 to a USB host mode when the voltage is not greater than the predetermined value (S21). As shown in FIG. 6C, the controller 180 changes the mode of the mobile terminal 100 to a USB peripheral mode when the voltage is greater than the predetermined value (S31). A more detailed description relating to the host mode will first be given with respect to FIG. 6B.

As shown in FIG. 6B, a current of less than 100 mA is supplied to the USB peripheral device through the USB_Vbus pin (S22), and the controller 180 waits to receive a reset signal from the peripheral device for a predetermined period of time (S23). If the reset signal is received from the USB peripheral device (Yes in S23), the controller 180 transmits or sends a packet to the USB peripheral device for configuring the peripheral device (S24). Also, when the operation of recognizing the USB peripheral device is finished (Yes in S25), a current of less than 500 mA is supplied to the USB peripheral device (S26). The detector 171 then determines if the USB connector 400 is removed (S27). When the USB connector 400 is disconnected (Yes in S27), the USB_Vbus pin associated with the power supply, and the D+/D− pins are set to the initial state (S11). Similarly, if the reset signal is not received from the peripheral device (No in S23), the controller 180 determines if a time out period has occurred (S28), and resets the pins when the time out has occurred (S11)

A more detailed description relating to the peripheral mode will now be given with respect to FIG. 6C. As shown in FIG. 6C, a current of less than 100 mA is received from the USB host device (S32), and a reset signal is transmitted through the D+ or D− pin (S33). Subsequently, a packet for configuring the mobile terminal set as the peripheral device is transmitted and/or received to and/or from the USB host device (S34). When the operation of recognizing the mobile terminal as the USB peripheral device is finished (Yes in S35), a current of less than 500 mA is supplied from the USB host device (S36). The detector 171 also checks for the connection or disconnection of the USB connector 400 (S37), and when the USB connector is disconnected (Yes in S37), the USB_Vbus pin, and D+/D− pins are set to the initial state (S11).

Figure 7A:
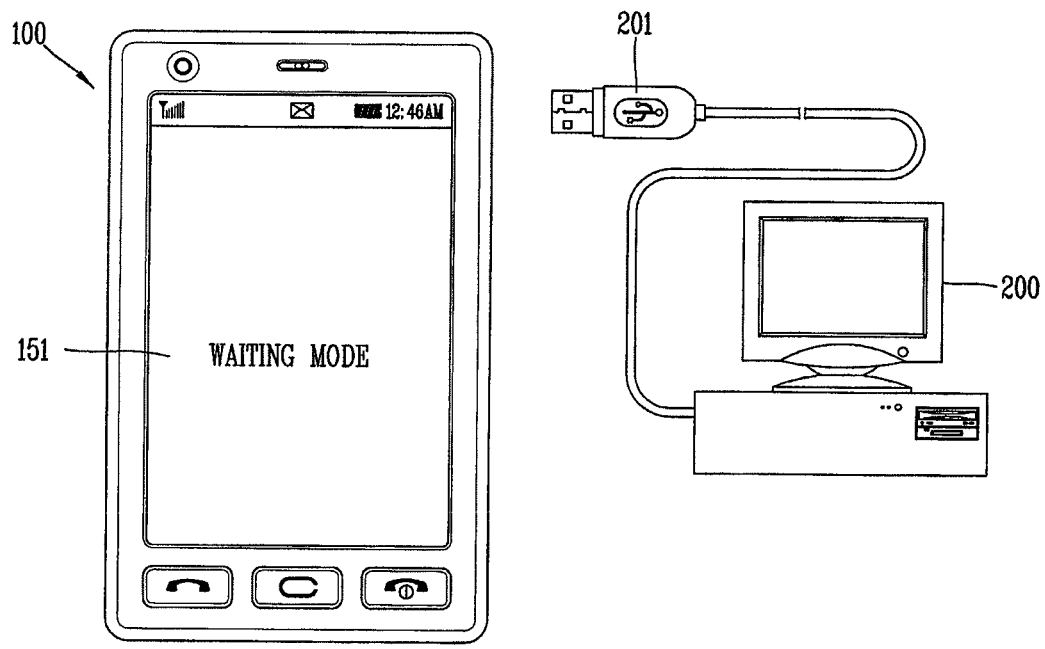
FIGS. 7A to 7C are operational state diagrams illustrating a process of connecting a mobile terminal to a USB host device according to an embodiment of the present invention.
Figure 7B:
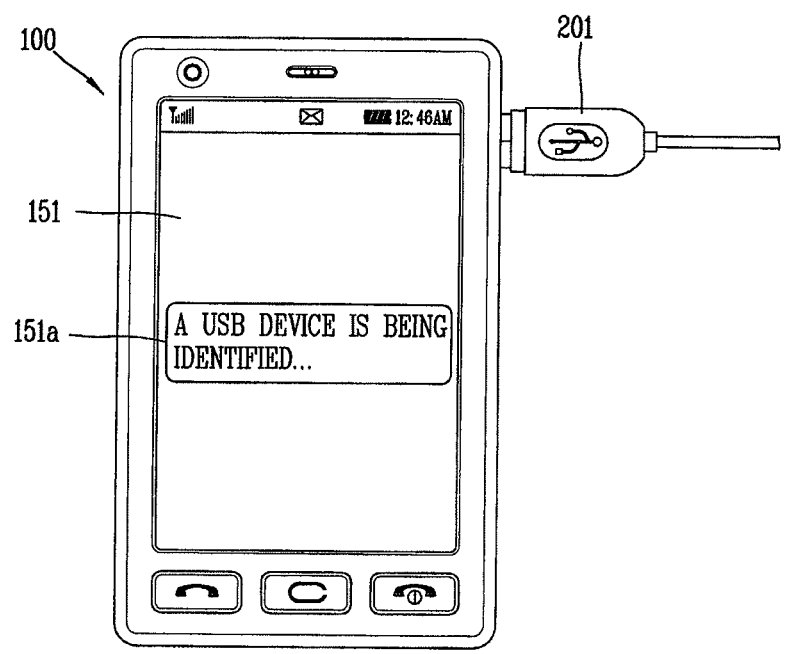
Figure 7C:
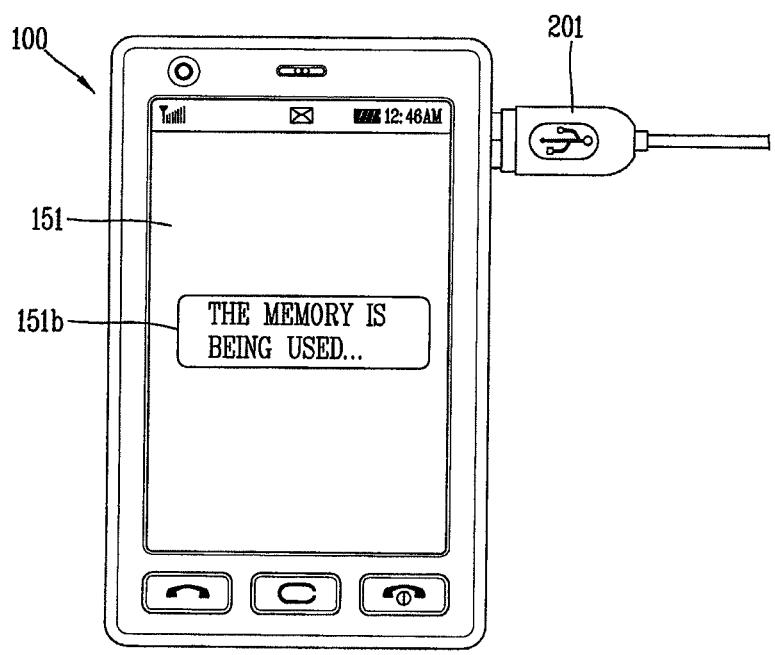

Next, FIGS. 7A to 7C are operational state diagrams illustrating a process of connecting the mobile terminal 100 to the USB host device 200 (computer in this example) according to an embodiment of the present invention. As shown, when the connector 201 of the USB host device 200 is connected to the terminal 100 from a waiting state as illustrated in FIGS. 7A and 7B, the controller 180 determines the USB device 200 is a USB host and changes the terminal 100 into a peripheral device in accordance with the method shown in FIG. 6C, for example. The controller 180 can also display a message 151*a* on the display unit 151 notifying the user that a USB device 200 is being identified as shown in FIG. 7B. Then, when the mobile terminal 100 is set as the USB peripheral device, the controller 180 can also display a message 151*b* on the display unit 151 for notifying the user that the mobile terminal is being used as a USB peripheral device as shown in FIG. 7C.

Figure 8A:
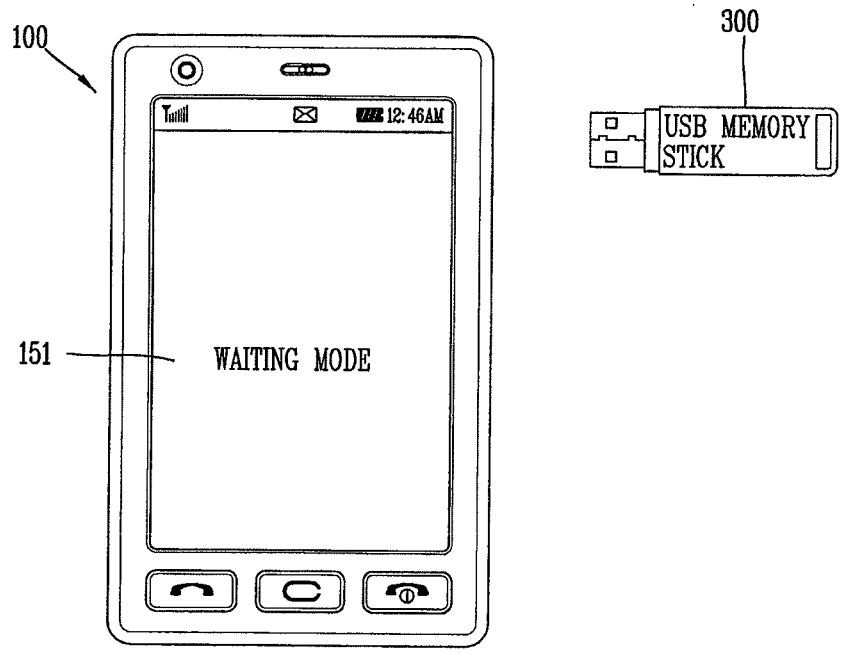
FIGS. 8A to 8C are operational state diagrams illustrating a process of connecting a mobile terminal to a USB memory stick according to an embodiment of the present invention.
Figure 8B:
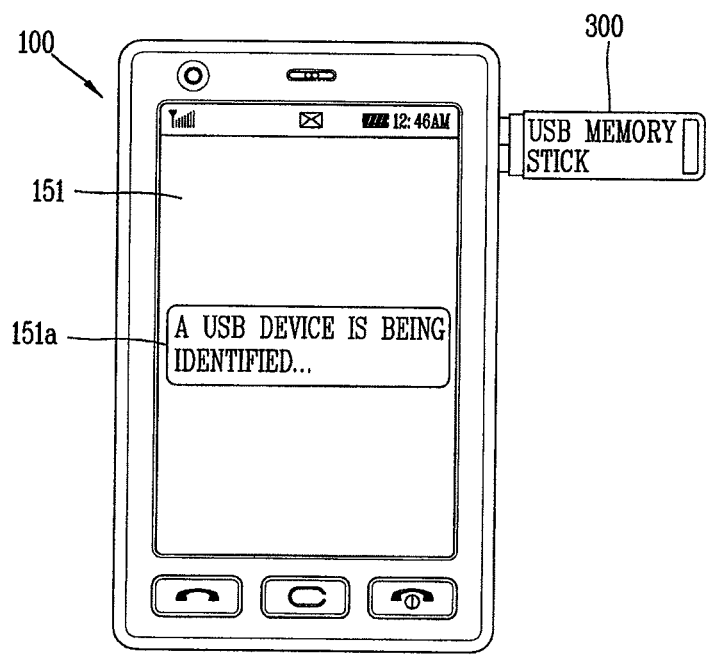
Figure 8C:
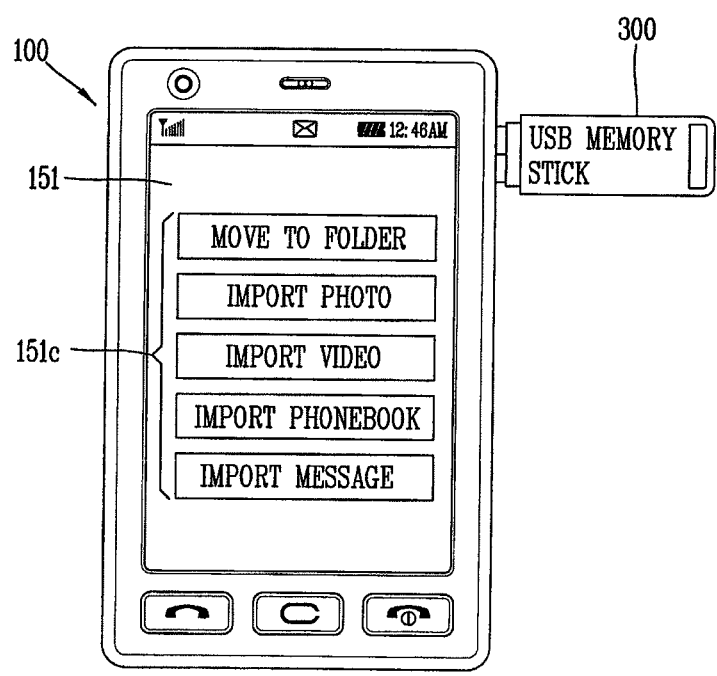

Next, FIGS. 8A to 8C are operational state diagrams illustrating a process of connecting the mobile terminal 100 to a USB memory stick 300 according to an embodiment of the present invention. As shown, when the USB memory stick 300 is inserted into the terminal 100 from a waiting state as illustrated in FIGS. 8A and 8B, the controller 180 determines the USB device 300 is a USB peripheral device and changes the terminal 100 into a USB host device in accordance with the method shown in FIG. 6B, for example. The controller 180 can also display the message 151*a* on the display unit 151 notifying the user that a USB device is being identified as shown in FIG. 8B. Then, when the mobile terminal 100 is set as the USB host device, the controller 180 can also display operable selection items 151*c* for allowing the user to select a desired operation through the display unit 151 as shown in FIG. 8C. In addition, the selection items are illustrative only, and various modifications may be made according to different embodiments of the present invention.

Figure 9A:
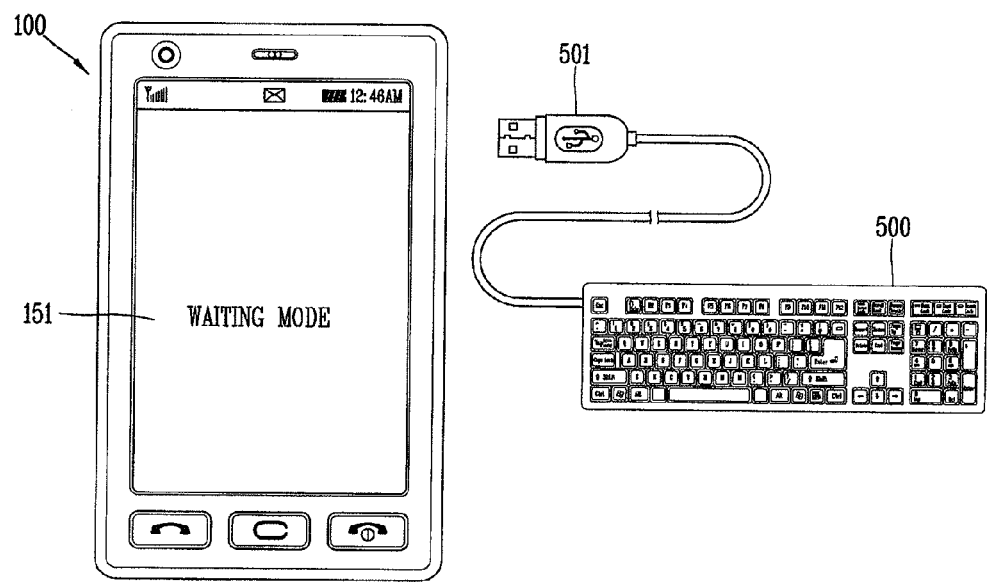
FIGS. 9A to 9C are operational state diagrams illustrating a process of connecting a mobile terminal to a USB keyboard device according to an embodiment of the present invention.
Figure 9B:
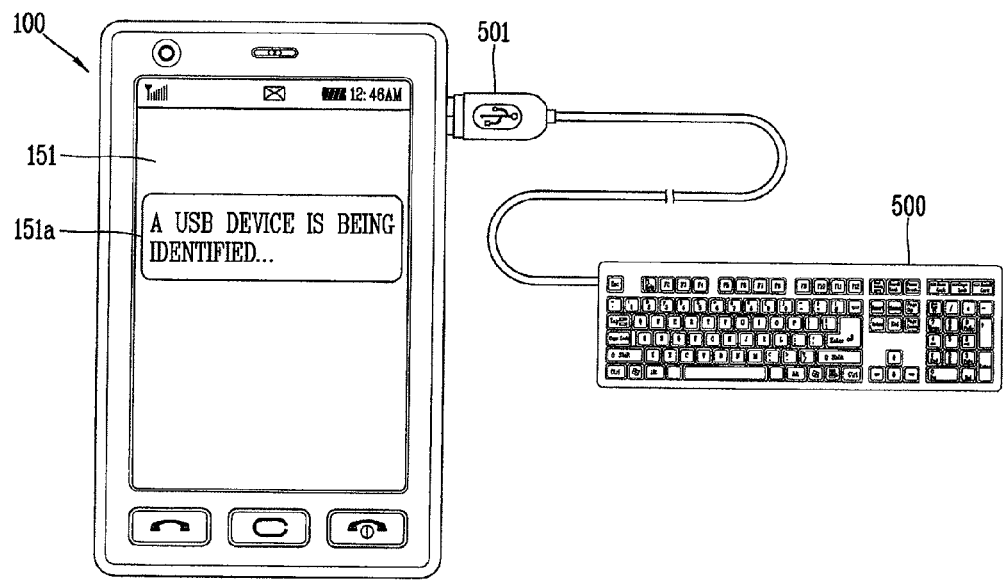

Next, FIGS. 9A to 9D are operational state diagrams illustrating a process of connecting the mobile terminal 100 to a USB keyboard device 500 according to an embodiment of the present invention. When a connector 501 of the USB keyboard device 500 is connected to the terminal 100 from a waiting state as shown in FIGS. 9A and 9B, the controller 180 determines the keyboard device 500 is a USB peripheral device, and the controller 180 sets the terminal 100 as the USB host device. Similar to FIG. 8, the controller 180 can also display the message 151a on the display unit 151 for notifying the user that the USB device is being identified.

Figure 9C:
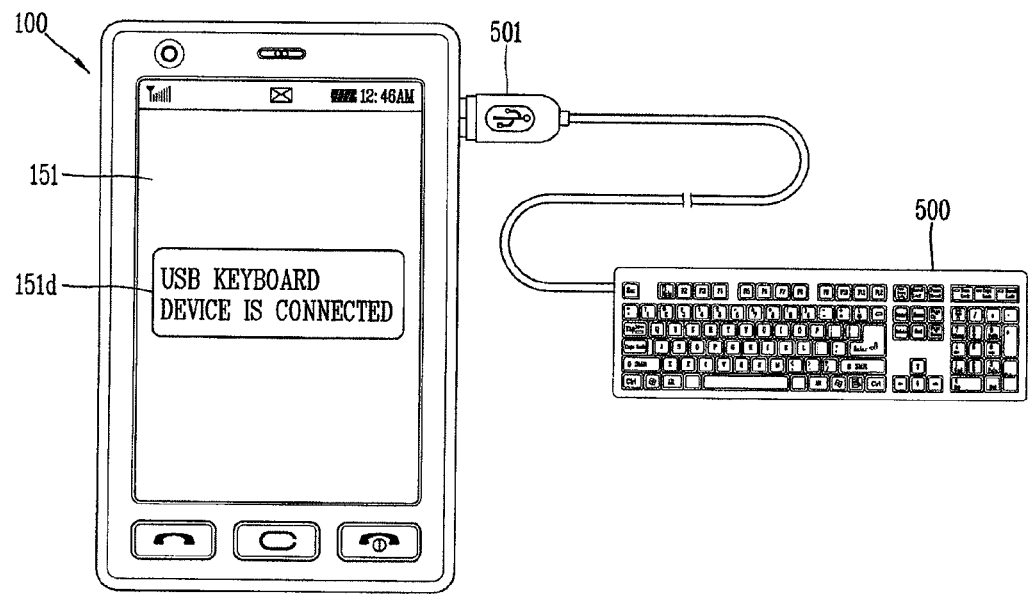
Figure 9D:
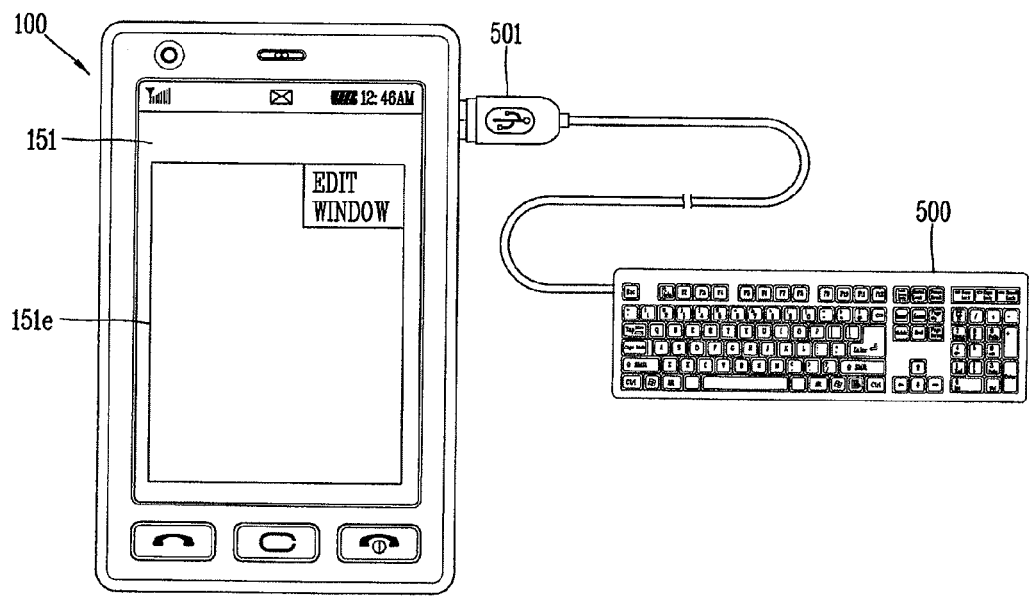

When an operation for identifying the USB keyboard device 500 is finished, the controller 180 can display a window 151d on the display unit 151 for notifying the user that the USB keyboard device 500 is connected as shown in FIG. 9C, and then immediately display an edit window 151e on the display unit 151 as shown in FIG. 9D. Further, when the USB keyboard device 500 is connected while the user is editing or creating a message, the controller 180 can display only a notification window for notifying the user that the USB keyboard device 500 is connected, and then proceed with an editing mode to perform an editing operation.

Figure 10A:
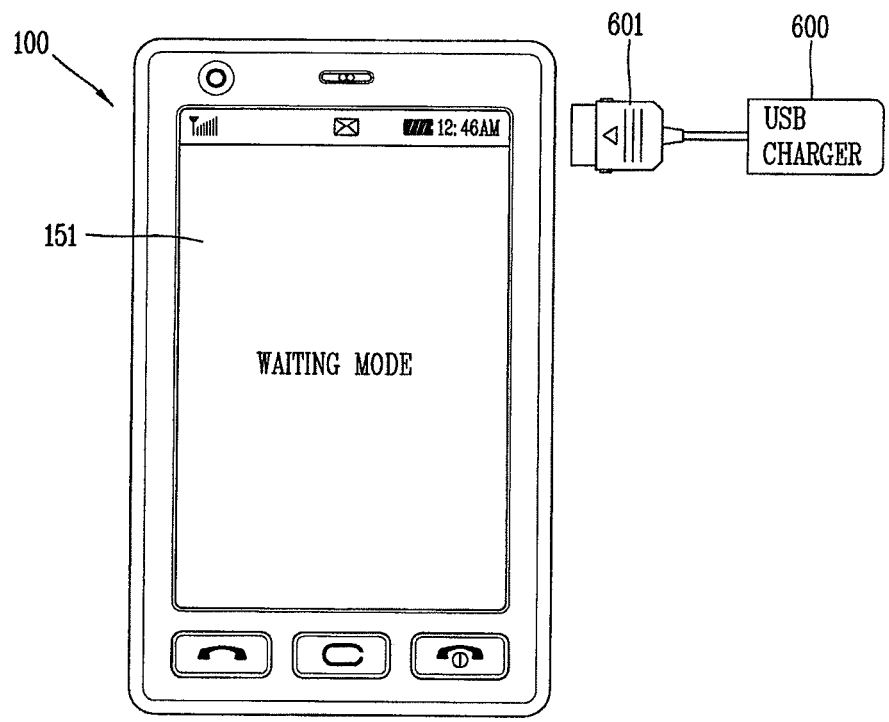
FIGS. 10A to 10C are operational state diagrams illustrating a process of connecting a mobile terminal to a charger according to an embodiment of the present invention.
Figure 10B:
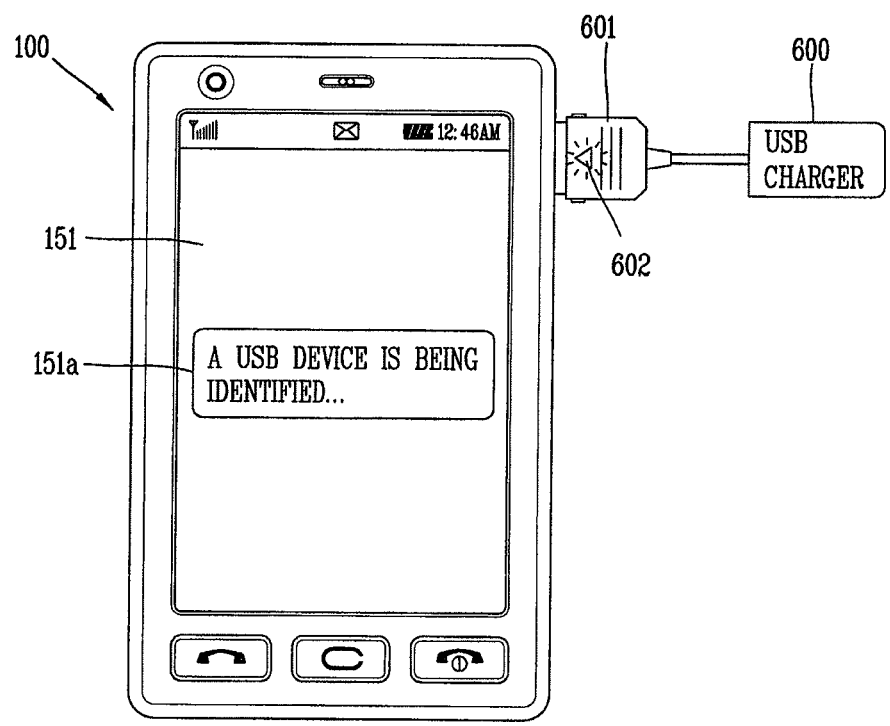
Figure 10C:
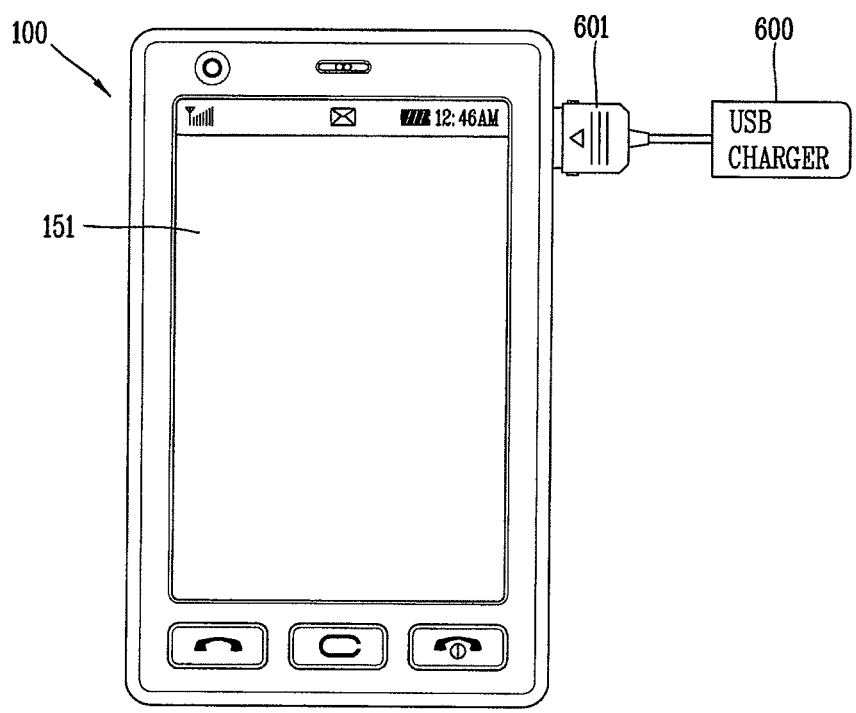

Next, FIGS. 10A to 10C are operational state diagrams illustrating a process of connecting the mobile terminal 100 to a charger 600 according to an embodiment of the present invention. When a connector 601 of the USB charger 600 is connected to the terminal 100 from a waiting state as shown in FIGS. 10A and 10B, the controller 180 recognizes the charger 600 as a USB peripheral device, and displays the message 151a on the display unit 151 for notifying the user that a USB device is being identified. The controller 180 also changes the terminal 100 into a USB host device. When the identifying operation is finished, the battery of the mobile terminal 100 is charged by the power supplied from the USB charger 600. Further as shown in FIG. 10B, the user can view the charged state through an indicator lamp 602 of the USB charger 600 or the connector 601 thereof.

Thus, the embodiments of the present invention allow the mobile terminal to be implemented as a USB host and a peripheral device through a single USB port. The setting of such a USB host or peripheral device is also automatically performed by a detection operation without requiring additional instruction or user input, thereby enhancing its convenience. Further, because a port of single USB Type A mounted on the mobile terminal is used in one embodiment of the present invention, a separate adaptor is not required to access a port of a USB Type B having a fifth pin, i.e., ID pin.

In addition, the detector is provided in the USB port, and any change or additional mount is not required for a USB connector inserted into the USB port. The mobile terminal can also be easily switched to a USB host or peripheral device with no conflict even in a form of USB Type A port such as a USB memory stick. A separate cable is also not needed to interface between the terminal 100 and a USB external device.

The mobile terminal as described above is not limited to the configurations and methods of the foregoing embodiments, but all or part of each embodiment may be selectively combined with each other so as to implement various modifications of the embodiments.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal, comprising:
a wireless communication unit configured to at least perform wireless voice communication with at least one other terminal;
a terminal body including a Universal Serial Bus (USB) port configured to be connected to an external device through the USB port;
a display unit including a touch detecting member and mounted at the terminal body;
a USB driver configured to recognize a USB keyboard device;
a detector configured to detect when the external device is connected to the USB port;
a USB power identification unit configured to detect if the external device is providing USB power to the mobile terminal or if the mobile terminal is providing the USB power to the external device; and
a controller configured to set the mobile terminal as a USB host device when the USB power identification unit determines the mobile terminal is providing the USB power to the external device, and to set the mobile terminal as a USB peripheral device when the USB power identification unit determines the external device is providing the USB power to the mobile terminal, said set USB peripheral device configured to send commands to the external device to perform operations on the external device,
wherein the controller displays a message on a display unit of the terminal body notifying a user that the external device is being identified, and
wherein, when the mobile terminal is set as the USB peripheral device, the message on the display unit is changed to a GUI related to the external device set as the USB host device,
wherein when a connector of the USB keyboard device is connected to the USB port, the controller recognizes the USB keyboard device and determines the keyboard device to be the USB peripheral device such that the user inputs information using the USB keyboard device even though the display unit includes the touch detecting member,
wherein, when the connector of the USB keyboard device is connected to the USB port in a standby mode of the mobile terminal, a window for outputting information input by the user is displayed in response to the connection of the USB keyboard device, and
wherein, when the connector of the USB keyboard device is connected to the USB port in a state where the window for outputting information input by the user is displayed, the displayed state of the window is maintained.

2. The mobile terminal of claim 1, wherein when the external device is a self-powered device and the mobile terminal is set as the USB host device, the USB power identification unit detects the external device is providing the USB power to the mobile terminal, and the controller is further configured to switch the mobile tellninal from the USB host device to the USB peripheral device.

3. The mobile terminal of claim 1, wherein when the external device is not a self-powered device and the mobile terminal is set as the USB host device, the USB power identification unit detects the mobile terminal is providing the USB power to the external device, and the controller is further configured to maintain the mobile terminal as the USB host device.

4. The mobile terminal of claim 1, wherein when the external device is a self-powered device and the mobile terminal is set as the USB peripheral device, the USB power identification unit detects the external device is providing the USB power to the mobile terminal, and the controller is further configured to maintain the mobile terminal as the USB peripheral device.

5. The mobile terminal of claim 1, wherein when the external device is not a self-powered device and the mobile terminal is set as the USB peripheral device, the USB power identification unit detects the mobile terminal is providing the USB power to the external device, and the controller is further configured to switch the mobile terminal from the USB peripheral device to the USB host device.

6. The mobile terminal of claim 1, wherein the controller is further configured to set the mobile terminal as the USB host device or the USB peripheral device automatically and without user interaction.

7. The mobile terminal of claim 1, wherein the controller is further configured to prompt a user of the mobile terminal if it is ok to set the mobile terminal as the USB host device or the USB peripheral device, before setting the mobile terminal as the USB host device or the USB peripheral device.

8. The mobile terminal of claim 1, wherein the detector is configured to float away from a ground of the terminal body when the external device is not inserted into the USB port, and to be connected to the ground when the external device is connected to the USB port.

9. The mobile terminal of claim 8, wherein the detector comprises:
a fixed pin fixed to the USB port; and
an elastically deformable movable pin disposed to be separated from the fixed pin when the external device is not inserted, and that is pressed and deformed by the external device to be contacted to the fixed pin when the external device is inserted into the USB port.

10. The mobile terminal of claim 1, wherein the USB port includes a 4-pin USB Type A.

11. A mobile terminal, comprising:
a wireless communication unit configured to at least perform wireless internet access;
a terminal body including a connection port configured to be connected to an external charging device through the connection port;
a display unit including a touch detecting member and mounted at the terminal body;
a driver for recognizing a keyboard device;
a detector configured to detect if the keyboard device is connected to the connection port;
a power identification unit configured to detect if the external charging device is providing power to the mobile terminal or if the mobile terminal is providing the power to the external charging device; and
a controller configured to set the mobile terminal as a host device when the power identification unit determines the mobile terminal is providing the power to the keyboard device, and to set the mobile terminal as a peripheral device when the power identification unit determines the external charging device is providing the power to the mobile terminal, said set peripheral device configured to send commands to the external charging device to perform operations on the external charging device,
wherein the controller displays a message on a display unit of the terminal body notifying the user that the external charging device is being identified, and a battery of the mobile terminal is charged by the power supplied from the external charging device, and
wherein, when a connector of the keyboard device is connected to the connection port, the controller recognizes the keyboard device via the driver such that the user inputs information using the keyboard device even though the display unit includes the touch detecting member,
wherein, when the connector of the keyboard device is connected to the connection port in a standby mode of the mobile terminal, a window for outputting information input by the user is displayed in response to the connection of the keyboard device, and
wherein, when the connector of the keyboard device is connected to the connection port in a state where the window for outputting information input by the user is displayed, the displayed state of the window is maintained.

12. The mobile terminal of claim 11, wherein the connection port is configured as a Universal Serial Bus (USB) port.

13. The mobile terminal of claim 12, wherein the USB port includes a 4-pin USB Type A.

14. The mobile terminal of claim 11, wherein when a connector of the keyboard device is connected to the connection port, the controller determines whether to change a current mode into another mode or to maintain the current mode based on a type of the current mode.

* * * * *